(12) United States Patent
Lu et al.

(10) Patent No.: US 9,411,990 B2
(45) Date of Patent: Aug. 9, 2016

(54) WORKING METHOD OF A MULTI-SLOT CARD READER BASED ON THE STANDARD CCID PROTOCOL

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/784,310

(22) PCT Filed: Jun. 19, 2014

(86) PCT No.: PCT/CN2014/080298
§ 371 (c)(1),
(2) Date: Oct. 14, 2015

(87) PCT Pub. No.: WO2014/206239
PCT Pub. Date: Dec. 31, 2014

(65) Prior Publication Data
US 2016/0098582 A1    Apr. 7, 2016

(30) Foreign Application Priority Data

Jun. 24, 2013    (CN) .......................... 2013 1 0251947

(51) Int. Cl.
| G06K 7/06 | (2006.01) |
| G06K 13/00 | (2006.01) |
| G06K 7/00 | (2006.01) |
| G06F 13/10 | (2006.01) |
| G06F 13/38 | (2006.01) |

(Continued)

(52) U.S. Cl.
CPC .............. *G06K 7/0056* (2013.01); *G06F 13/10* (2013.01); *G06F 13/382* (2013.01); *G06K 7/10366* (2013.01); *G06K 19/07743* (2013.01)

(58) Field of Classification Search
USPC .................................. 235/441, 475, 483, 486
See application file for complete search history.

(56) References Cited

U.S. PATENT DOCUMENTS

| 7,748,636 B2 * | 7/2010 | Finn ..................... G06K 7/0008 235/375 |
| 8,443,120 B2 | 5/2013 | Lu et al. |

(Continued)

*Primary Examiner* — Tuyen K Vo
(74) *Attorney, Agent, or Firm* — Hammer & Associates, P.C.

(57) ABSTRACT

A working method of a multi-slot card reader based on the standard CCID protocol comprises: powering up to perform initialization, and establishing a connection with a host through a USB interface; when a USB configuration instruction is received, returning configuration information of the USB interface to the host; waiting to receive an instruction delivered by the host, when a flag bit of a reset is detected, determining the type of the flag bit of the reset, for example, if the flag bit is a contact card flag bit, recording, according to the type of a change of a card placement pin level of a current contact card slot, a corresponding state of the contact card slot, or for example, if the flag bit is a periodic flag bit, sending a card search instruction corresponding to a current non-contact card slot, and recording a corresponding state of the non-contact card slot; and if the flag bit is a USB flag bit, performing a corresponding operation on a current card slot according to the received instruction. The card reader adopts a USB chip having multiple terminations and serves as a composite device of the standard CCID. When accepting access of a host, the card reader access different card slots through different terminations, so that the compatibility is desirable.

21 Claims, 6 Drawing Sheets

(51) Int. Cl.
*G06K 7/10* (2006.01)
*G06K 19/077* (2006.01)

(56) References Cited

U.S. PATENT DOCUMENTS

| | | | |
|---|---|---|---|
| 2004/0211835 A1* | 10/2004 | Tournemille | G06K 7/0008 235/441 |
| 2006/0214003 A1* | 9/2006 | Morrow | G06K 7/0008 235/487 |
| 2009/0265722 A1* | 10/2009 | Lu | G06F 21/57 719/327 |
| 2012/0278508 A1* | 11/2012 | Lu | G06F 13/385 710/6 |
| 2013/0171846 A1* | 7/2013 | Agreda De Ro | G06K 19/07732 439/136 |

* cited by examiner

WORKING METHOD OF A MULTI-SLOT CARD READER BASED ON THE STANDARD CCID PROTOCOL

FIELD OF THE INVENTION

The present invention relates to the field of a card reader, in particular, to a working method for a card reader with multiple slots based on standard CCID (chip card interface device) protocol.

PRIOR ART

A card reader is a special apparatus with a card slot for a memory card and a port for a computer. The memory card is made by the computer as a portable memory after an appropriate memory card is inserted into the card slot, a port is connected to the computer and a needed device driver is installed, thus the memory card can be read via the card reader. In prior art, a private CCID driver is usually used, by a card reader, in technology of using a CCID driver to implement design of multiple slots, however, because of the issue of compatibility, there exit problems more or less.

SUMMARY OF THE INVENTION

The object of the present invention is to provide a working method for a card reader with multiple slots based on standard CCID protocol, and with the method, one card reader can achieve functions of multiple standard CCID one-slot card readers. When the card reader is visited by a host, different card slots of the card reader can be visited via different end-points, thus the method guarantees a better compatibility.

According to one aspect of the invention, there is provided a working method for a card reader with multiple card slots based on standard CCID protocol, including:

Step S1, powering on the card reader and initializing, connecting, by the card reader, to a host via an USB interface;

Step S2, waiting for receiving an instruction sent by the host, and detecting an USB flag bit, determining whether the USB flag bit is set, if yes, executing Step S3; if no, returning to Step S2;

Step S3, returning an configuration information of the USB interface to the host according to a received USB configuration instruction, in which the configuration information of the USB interface includes the amount of card slots and an end-point configuration of each card slot, and in which the end-point configuration of every slot includes an output end-point and an input end-point;

Step S4, determining whether the configuration information of the USB interface is returned to the host completely, if yes, executing Step S5; if no, returning to Step S2;

Step S5, waiting for receiving an instruction sent by the host, and when a set flag bit is detected, judging type of the set flag bit, executing Step S6 in the case that the flag bit is a contact card flag bit; executing Step S7 in the case that the flag bit is a timing flag bit; executing Step S10 in the case that the flag bit is an USB flag bit;

Step S6, in accordance with the contact card flag bit, determining change type of a "card-is-in-the-slot" pin electronic level of a corresponding current contact card slot, if the electronic level changes from low level to high level, the contact card flag bit is reset, and the status of the current contact card slot is recorded as with-a-card but not powered on, returning to Step S5; if the electronic level changes from high level to low level, the contact card flag bit is reset, and the status of the current contact slot is recorded as without-a-card, returning to Step S5;

Step S7, in accordance with the timing flag bit, sending a call-for-a-card instruction to a corresponding current non-contact card slot regularly, and determining whether a response is received in a preset time, if yes, executing Step S8; if no, executing Step S9;

Step S8, determining whether the recorded status of the current non-contact card slot is with-a-card, if yes, resetting the timing flag bit and returning to Step S5; if no, resetting the timing flag bit and recording the status of the current non-contact card as with-a-card, and returning to Step S5;

Step S9, determining whether the recorded status of the current non-contact card slot is without-a-card, if yes, resetting the timing flag bit and returning to Step S5; if no, resetting the timing flag bit and recording the status of the current non-contact card slot as without-a-card, and returning to Step S5;

Step S10, detecting a corresponding current card slot according to an output end-point of a received instruction;

Step S11, storing an instruction in an USB memory into a first buffer of the current card slot; and parsing the instruction in the first buffer, and performing a corresponding operation according to the parsed result to get a result, and storing the result into a second buffer of the current card slot;

Step S12, sending data in the second buffer to the host via an input end-point of the current card slot.

Preferably, between Step S2 and Step S3, the method further includes:

determining whether the USB configuration instruction is received, if yes, executing Step S3; if no, returning to Step S2.

Preferably, Step S3 further includes:

Step S3-1, detecting type of the received USB configuration instruction, executing Step S3-2 in the case that the USB configuration instruction is a device descriptor request; executing Step S3-3 in the case that the USB configuration instruction is a configuration descriptor request; executing Step S3-4 in the case that the USB configuration instruction is a card slot name request; executing Step S3-5 in the case that the USB configuration instruction is a card slot configuration request;

Step S3-2, sending the device descriptor to the host, and executing Step S4;

Step S3-3, sending a device configuration header byte and configuration data to the host, and executing Step S4; in which the configuration data includes the amount of card slots and a flag number of each card slot;

Step S3-4, returning name of a corresponding card slot to the host according to the flag number in the instruction, and executing Step S4;

Step S3-5, returning configuration information of the corresponding card slot to the host according to the flag number in the instruction, and executing Step S4; in which the configuration information of the card slot includes the output end-point and the input end-point.

Preferably, the initialization in Step S1 includes that a value of an enumeration flag is set as a preset initial value;

before Step S4, Step S3-2 further including that the value of the enumeration flag is set as a first preset value;

before Step S4, Step S3-3 further including that the value of the enumeration flag is set as a second preset value;

before Step S4, Step S3-4 further including that the value of the enumeration flag is set as a third preset value;

before Step S4, Step S3-5 further including that the value of the enumeration flag is set as a fourth preset value;

Step S4 specifically includes: determining whether the value of the enumeration flag is the fourth preset value, if yes, all of the configuration information of the USB interface is returned to the host, executing Step S5; if no, the configuration information of the USB interface is not completely returned to the host, returning to Step S2.

Preferably, the end-point configuration of each card slot further including an interruption end-point;

in Step S6, determining the "card-is-in-the-slot" pin electronic level of the current contact card slot changes from low level to high level further including: returning a with-a-card response to the host via the interruption end-point of the current contact card slot; in Step S6, determining that the "card-is-in-the-slot" pin electronic level of the current contact card slot changes from high level to low level further including: returning a without-a-card response to the host via the interruption end-point of the current contact card slot;

when the status of the current non-contact card slot is not with-a-card in Step S8, Step S8 further including: returning a with-a-card response to the host via the interruption end-point of the current non-contact card slot;

when the status of the current non-contact card slot is not without-a-card in Step S9, the Step further including: returning a without-a-card response to the host via the interruption end-point of the current non-contact card slot.

Preferably, parsing data in the first buffer, and performing corresponding operation according to the parsed result to get a result, and storing the result into the second buffer in Step S11 further comprising:

Step S11-1, determining whether the instruction in the first buffer is legitimate, if yes, executing Step S11-3; if no, executing Step S11-2;

Step S11-2, setting demand-error information and storing the demand-error information into the second buffer, and executing Step S12;

Step S11-3, detecting type of the instruction in the first buffer, and performing corresponding operation.

Preferably, Step S11-3 includes:

if the type of the instruction in the first buffer is a power-on instruction, powering on the card in the current card slot, determining whether an answer-to-reset file sent by the card is received, if yes, setting information of powering on successfully, and storing the information into the second buffer, and executing Step S12; if no, setting information of powering on unsuccessfully, and storing the information into the second buffer, and executing Step S12.

Preferably, Step S11-3 includes:

if the type of the instruction in the first buffer is a power-off instruction, powering off the card in the current card slot; setting information of powering off successfully, and storing the information into the second buffer, and executing Step S12.

Preferably, Step S11-3 includes:

if the type of the instruction in the first buffer is a set-parameter instruction, consulting communication parameter according to an instruction parameter in the first buffer and the card in the current card slot; and determining whether the communication parameter is successfully consulted, if yes, saving the communication parameter and storing the parameter into the second buffer, and setting the CPU interface correspondingly according to the saved communication parameter, and executing Step S12; if no, storing a defaulted communication parameter into the second buffer, and executing Step S12.

Preferably, determining whether the communication parameter is successfully consulted including: determining whether the data returned by the card is identical to the data sent to the card, if yes, the communication parameter is successfully consulted; if no, the communication parameter is not successfully consulted.

Preferably, Step S11-3 includes:

if the type of the instruction in the first buffer is an obtain-parameter instruction, obtaining corresponding parameter according to the instruction, and storing the parameter into the second buffer, and executing Step S12.

Preferably, Step S11-3 includes:

if the type of the instruction in the first buffer is a reset-parameter instruction, performing resetting operation according to the reset-parameter instruction, and storing a defaulted parameter into the second buffer, and executing Step S12.

Preferably, Step S11-3 includes:

if the type of the instruction in the first buffer is an extend-channel instruction, performing corresponding operation according to the extend-channel instruction, and storing a result into the second buffer, and executing Step S12.

Preferably, Step S11-3 includes:

if the type of the instruction in the first buffer is a data-exchange APDU instruction, in accordance with the answer-to-reset file, determining type of a protocol on data transfer, if the type is T1, executing Step C1; if the type is T0, executing Step C3;

Step C1, sending all data packages in the first buffer to a card in the current card slot, and waiting for a response returned by the card;

Step C2, receiving the response returned by the card, and storing the response into the second buffer, and executing Step S12;

Step C3, parsing APDU data in the data-exchange APDU instruction to obtain a length of the sent data and a length of the received data;

Step C4, sending the first five byte-codes in the APDU data to the card, and receiving a processing byte-code returned by the card;

Step C5, determining whether the byte-code is a first preset character string, if yes, executing Step C6, if no, executing Step C9;

Step C6, determining whether the first preset character string is 0x60, if yes, executing Step C7, if no, executing Step C8;

Step C7, setting a busy-response, and storing the busy-response into the second buffer, resetting a waiting time, and executing Step S12;

Step C8, receiving a status code of one byte, setting a return-data response and storing it into the second buffer, and executing Step S12;

Step C9, determining whether the first preset character string is $\overline{INS}$, if yes, executing Step C10, if no, executing Step C13;

Step C10, determining whether data which is not sent to the card exists, if yes, executing Step C11; if no, executing Step C12;

Step C11, continuing to send data of one byte to the card, and receiving a processing byte-code of one byte returned by the card, and returning to Step C5;

Step C12, receiving the data of one byte and the processing byte code of one byte, both of which are received by the card, and returning to Step C5;

Step C13, determining whether the data is sent completely, if yes, executing Step C14, if no, executing Step C15;

Step C14, receiving data for receiving the length of data and status-byte-code of one byte, both of which are returned by the card;

Step C15, in accordance with the length of sent data, sending a left byte to the card, and receiving data for receiving the length of data and status-byte-code of one byte, both of which are returned by the card, returning to Step C5;

Preferably, the first preset character string is anyone between 0x60 and 0x6F or anyone between 0x90 and 0x9F.

Preferably, Step S11-3 includes:

if the type of the instruction in the first buffer is a query instruction, storing the recorded card slot status into the second buffer, and executing Step S12.

Preferably, Step S11-1 further includes: parsing data in the first buffer to obtain a type of the instruction and a length of the data, and determining whether the parsed length of data is identical to the length of entire data in the first buffer, if yes, the instruction in the first buffer is legitimate, executing Step S11-3; if no, the instruction in the first buffer is not legitimate, executing Step S11-2.

Preferably, Step S12 specifically includes:

Step S12-1, determining whether a send-flag is set, if yes, executing Step S12-2, if no, executing Step S12-1;

Step S12-2, sending data in the second buffer to the host via the input end-point of the current card slot, and determining whether the send-flag is set, if yes, returning to Step S5, if no, returning to Step S12-2.

According to the other aspect of the present invention, there is provided a working method for a card reader with multiple card slots based on standard CCID protocol, including:

Step P1, powering on the card reader and starting initialization, and connecting, by the card reader, to a host via an USB interface;

Step P2, turning on an USB communication interruption;

Step P3, waiting for an USB communication interrupt signal, when receiving the USB communication interrupt signal, entering USB interruption to perform corresponding operation, and executing Step P4; configuration information of an USB interface including the amount of card slots and an end-point configuration of each card slot, in which the end-point configuration of each card slot includes an output end-point and an input end-point;

Step P4, determining whether all of the configuration information of the USB interface is returned to the host, if yes, executing Step P5; if no, returning to Step P3;

Step P5, turning on a timer interruption and an external interruption;

Step P6, when an interruption signal is detected, determining type of the interruption signal, if the signal is an USB communication interrupt signal, entering USB communication interruption including Step A1 to Step A4; if the signal is a timer interruption signal, entering timer interruption including Step B1 to Step B3; if the signal is an external interruption signal, entering external interruption including Step C1;

Step A1, in accordance with the output end-point of the received instruction, detecting a corresponding current card slot of the USB communication interruption;

Step A2, storing the received instruction into a first buffer of the current card slot;

Step A3, parsing the instruction in the first buffer, according to the parsed result, performing corresponding operation to get a result, and storing the result into a second buffer of the current card slot;

Step A4, sending data in the second buffer to the host via an input end-point of the current card slot, exiting USB communication interruption, and returning to Step P6;

Step B1, in accordance with a timer interruption, sending a call-for-a-card instruction to currently corresponding non-contact card slot, and then determining whether a response is received in a preset time, if yes, executing Step B2; if no, executing Step B3;

Step B2, determining whether the recorded status of the current non-contact card slot is a with-a-card status, if yes, exiting the timer interruption, and returning to Step P6; if no, recording the status of the current non-contact card slot as with-a-card, exiting the timer interruption, and returning to Step P6;

Step B3, determining whether the recorded status of the current non-contact card slot is a without-a-card status, if yes, exiting the timer interruption, and returning to Step P6; if no, recording the status of the current non-contact card slot as without-a-card, exiting the timer interruption, and returning to Step P6;

Step C1, in accordance with the external interruption, determining change type of a "card-is-in-the-slot" pin electronic level of a currently corresponding contact card slot, if the electronic level changes from low level to high level, recording the status of the contact card slot as with-a-card but not power-on, exiting the external interruption, and returning to Step P6; if the electronic level changes from high level to low level, recording the status of the contact card slot as without-a-card, exiting the external interruption, and returning to Step P6.

Preferably, entering an USB communication interruption to perform corresponding operation in Step P3 comprises:

Step D1, detecting type of the received USB configuration instruction, executing Step D2 in the case that the USB configuration instruction is a device descriptor request; executing Step D3 in the case that the USB configuration instruction is a configuration descriptor request; executing Step D4 in the case that the USB configuration instruction is a card slot name request; executing Step D5 in the case that the USB configuration instruction is a card slot configuration request;

Step D2, sending the device descriptor to the host, exiting USB communication interruption, and executing Step P4;

Step D3, sending a header byte of device configuration and configuration data to the host, exiting the USB communication interruption, and executing Step P4; in which the configuration data includes the amount of card slots and a flag number corresponding to each card slot;

Step D4, returning a name of a corresponding card slot to the host according to the flag number in the instruction, exiting the USB communication interruption, and executing Step P4;

Step D5, returning the configuration information corresponding to the card slot to the host according to the flag number in the instruction, exiting USB communication interruption, and executing Step P4; in which the configuration information of the card slot includes an output end-point and an input end-point.

Preferably, before P4, Step D2 further includes that a value of an enumeration flag is set as a first preset value;

before Step P4, Step D3 further includes that the value of the enumeration flag is set as a second preset value;

before Step P4, Step D4 further includes that the value of the enumeration flag is set as a third preset value;

before Step P4, Step D5 further includes that the value of the enumeration flag is set as a fourth preset value;

Specifically, Step P4 includes that determine whether the value of the enumeration flag is the fourth preset value, if yes, all of the configuration information of the USB interface is returned to the host, and executing Step P5; if no, not all of the configuration information of the USB interface is returned to the host, and returning to Step P3.

Preferably, the end-point configuration of each card slot further including an interruption end-point;

when the recorded status of the non-contact card slot is not the status of with-a-card, Step B2 further including that a with-a-card response is returned to the host via the interruption end-point of the current non-contact card slot;

when the recorded status of the non-contact card slot is not the status of without-a-card, Step B3 further including that a without-a-card response is returned to the host via the interruption end-point of the current non-contact card slot;

in Step C1, determining that the "card-is-in-the-slot" pin electronic level of the current contact card slot changes from low level to high level further including: returning a with-a-card response to the host via the interruption end-point of the current contact card slot; in Step C1, determining that the "card-is-in-the-slot" pin electronic level of the current contact card slot changes from high level to low level further including: returning a without-a-card response to the host via the interruption end-point of the current contact card slot;

Preferably, parsing data in the first buffer, and performing corresponding operation according to the parsed result to get a result, and storing the result into the second buffer in Step A3 comprises:

Step A3-1, determining whether data in the first buffer is legitimate, if yes, executing Step A3-3; if no, executing Step A3-2;

Step A3-2, setting demand-error information and storing the demand-error information into the second buffer, and executing Step A4;

Step A3-3, detecting type of the instruction in the first buffer, and performing corresponding operation.

Preferably, Step A3-3 includes:

if the type of the instruction in the first buffer is a power-on instruction, powering on the card in the current card slot, and determining whether an answer-to-reset file returned by the card is received, if yes, setting information of powering on successfully, and storing the information into the second buffer, and executing Step A4; if no, setting information of powering on unsuccessfully, and storing the information into the second buffer, and executing Step A4.

Preferably, Step A3-3 includes:

if the type of the instruction in the first buffer is a power-off instruction, powering off the card in the current card slot; setting information of powering off successfully, storing the information into the second buffer, and executing Step A4.

Preferably, Step A3-3 includes:

if the type of the instruction in the first buffer is a set-parameter instruction, consulting communication parameter according to an instruction parameter in the first buffer and the card in the current card slot; and determining whether the communication parameter is successfully consulted, if yes, saving the communication parameter and storing the parameter into the second buffer, setting the CPU interface correspondingly according to the saved communication parameter, and executing Step A4; if no, storing a defaulted communication parameter into the second buffer, and executing Step A4.

Preferably, determining whether the communication parameter is successfully consulted including: determining whether the data returned by the card is identical to the data sent to the card, if yes, the communication parameter is successfully consulted; if no, the communication parameter is not successfully consulted.

Preferably, Step A3-3 includes:

if the type of the instruction in the first buffer is an obtain-parameter instruction, obtaining corresponding parameter according to the instruction, storing the parameter into the second buffer, and executing Step A4.

Preferably, Step A3-3 includes:

if the type of the instruction in the first buffer is a reset-parameter instruction, performing resetting operation according to the reset-parameter instruction, and storing a defaulted parameter into the second buffer, and executing Step A4.

Preferably, Step A3-3 includes:

if the type of the instruction in the first buffer is an extend-channel instruction, performing corresponding operation according to the extend-channel instruction, and storing a result into the second buffer, and executing Step A4.

Preferably, Step A3-3 includes:

if the type of the instruction in the first buffer is a data-exchange APDU instruction, in accordance with the answer-to-reset file, determining type of protocol on data transfer, if the type is T1, executing Step C1; if the type is T0, executing Step C3;

Step C1, sending all data packages in the first buffer to a card in the current card slot, and waiting for a response returned by the card;

Step C2, receiving the response returned by the card, storing the response into the second buffer, and executing Step A4;

Step C3, parsing APDU data in the data-exchange APDU instruction to obtain length of the sent data and length of the received data;

Step C4, sending the first five byte-codes in the APDU data to the card, and receiving the processing byte-code returned by the card;

Step C5, determining whether the byte-code is a first preset character string, if yes, executing Step C6, if no, executing Step C9;

Step C6, determining whether the first preset character string is 0x60, if yes, executing Step C7, if no, executing Step C8;

Step C7, setting a busy-response, and storing the busy-response into the second buffer, resetting a waiting time, and executing Step A4;

Step C8, receiving a status word of one byte, setting a return-data response and storing the return-data response into the second buffer, and executing Step S12;

Step C9, determining whether the first preset character string is $\overline{INS}$, if yes, executing Step C10, if no, executing Step C13;

Step C10, determining whether data which is not sent to the card exists, if yes, executing Step C11; if no, executing Step C12;

Step C11, continuing to send data of one byte to the card, and receiving a processing byte-code of one byte returned by the card, and returning to Step C5;

Step C12, receiving the data of one byte and the processing byte code of one byte, both of which are received by the card, and returning to Step C5;

Step C13, determining whether all data is sent, if yes, executing Step C14, if no, executing Step C15;

Step C14, receiving data for receiving length of data and status-byte-code of one byte, both of which are returned by the card, and returning to Step C5;

Step C15, in accordance with length of sent data, sending left byte to the card, and receiving data for receiving length of data and status-byte-code of one byte, both of which are returned by the card, and returning to Step C5;

Preferably, the first preset character string is anyone between 0x60 and 0x6F or anyone between 0x90 and 0x9F.

Preferably, Step A3-3 includes:

if the type of the instruction in the first buffer is a query instruction, storing the recorded card slot status into the second buffer, and executing Step A4.

Preferably, Step A3-1 further includes: parsing data in the first buffer to obtain type of the instruction and length value of the data, and determining whether the parsed length of data is identical to length value of entire data in the first buffer, if yes, the instruction in the first buffer is legitimate, and executing Step A3-3, if no, the instruction in the first buffer is not legitimate, and executing Step A3-2.

Preferably, Step A4 further includes:

Step A4-1, determining whether a send-flag is set, if the send-flag is set, executing Step A4-2, if the send-flag is not set, executing Step A4-1;

Step A4-2, sending data in the second buffer to the host via input end-point of the current card slot, and determining whether the send-flag is set, if the send-flag is set, returning to Step P6, if it is not set, returning to Step A4-2.

Compared with the conventional technology, the present invention has advantages as follow:

the card reader in this method sends multiple standard CCID protocol end-points to the host via an USB chip with multiple end-points. As a composite apparatus with standard CCID protocol, the card reader can realize functions of multiple card readers with CCID protocol. When the card reader is accessed by the host, different card slots are accessed via different end-points, so as to ensure a better compatibility.

DETAILED DESCRIPTION OF EMBODIMENTS

The working method for a card reader with multiple card slots based on standard CCID protocol, embodiments and advantages of the present invention are further described more clearly and completely with the drawings and preferable embodiments as follow.

Embodiment 1

Figure 1:
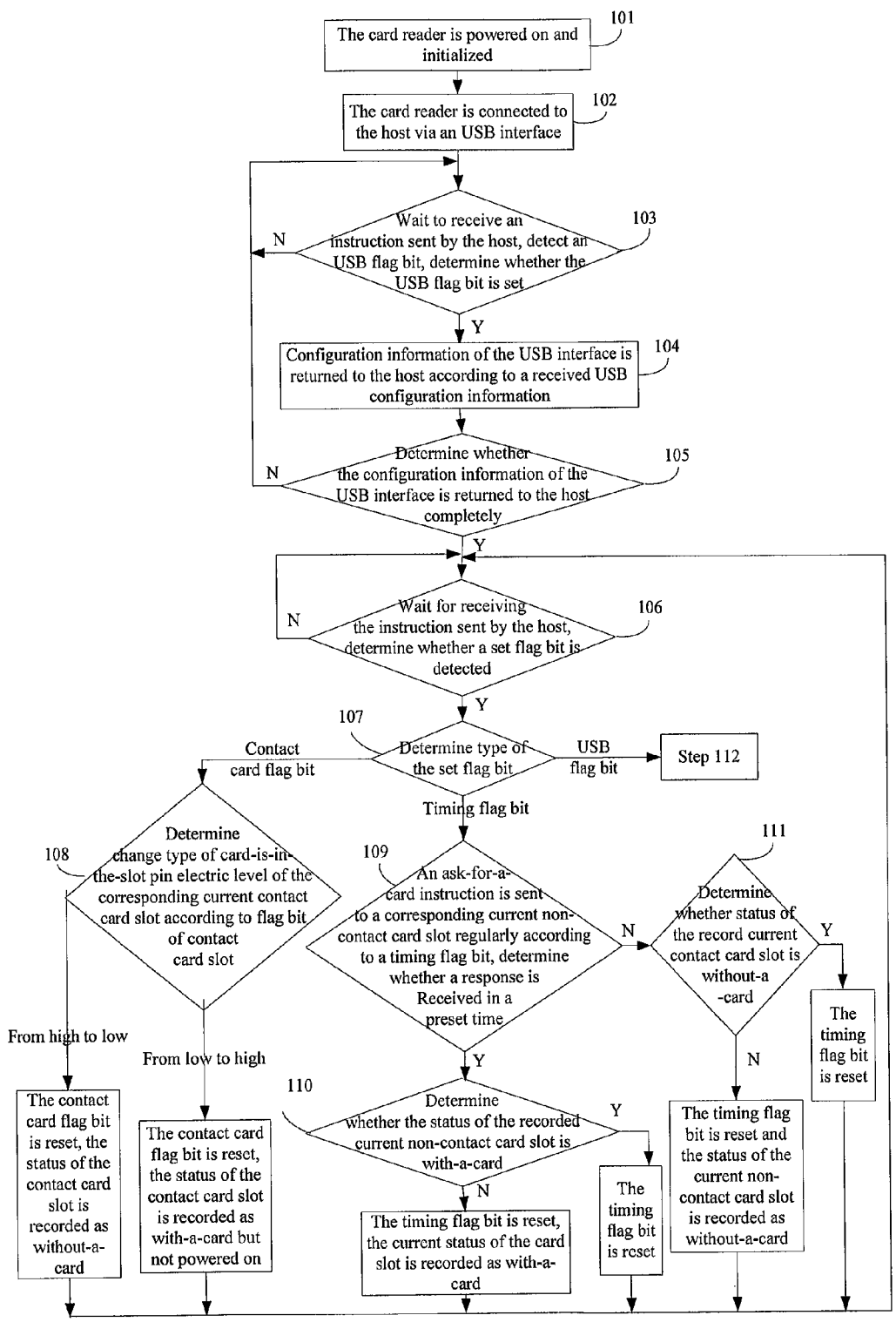
FIGS. 1-2 show a flowchart of a working method for a card reader with multiple card slots based on standard CCID protocol according to Embodiment 1 of the present invention.
Figure 2:
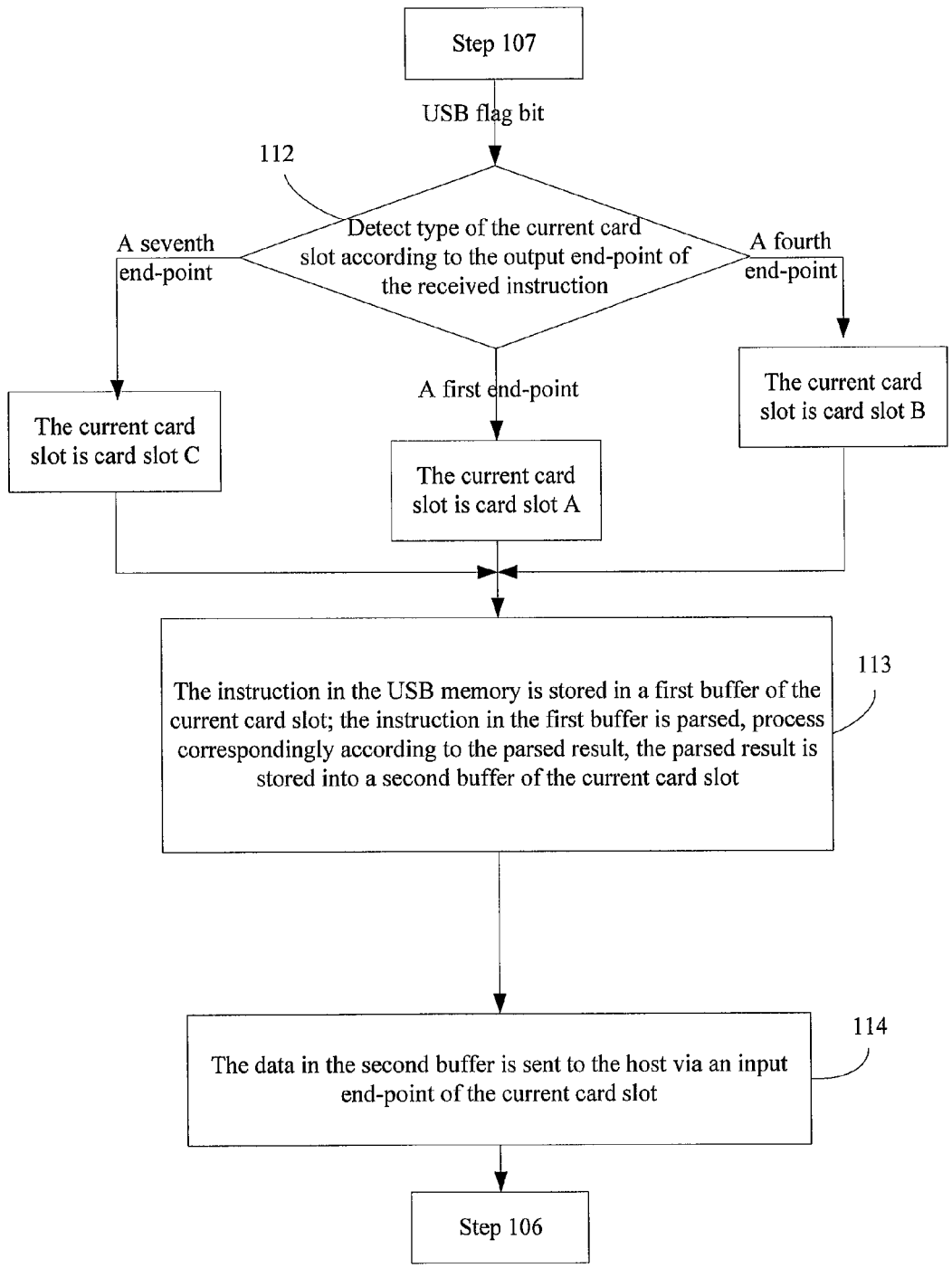

Embodiment 1 of the present invention provides a working method for a card reader with multiple card slots based on standard CCID protocol. In Embodiment 1, a card reader with three card slots (card slot A, card slot B and card slot C) is taken as an example, and it can be used as three independent devices (device A, device B and device C). As shown in FIG. 1 and FIG. 2, the method includes Step 101 to Step 114.

In Step 101, the card reader is powered on and initialized;

In Embodiment 1, RCC, IO, terminal external hardware, USB clock and other USB register configuration are initialized by the card reader; and value of enumeration flag is set as a preset initial value;

In Step 102, the card reader is connected to a host via an USB interface;

In Step 103, wait for an instruction sent by the host, and detect an USB flag bit, and determine whether the USB flag bit is set, if the USB flag bit is set, execute Step 104; if the USB flag bit is not set, return to Step 103;

In Embodiment 1, when the instruction sent by the host is received, it is stored in an USB memory, when data in the USB memory is detected by a hardware, the USB flag bit is set; in the Embodiment 1, any data sent by the host is not received until an USB configuration instruction is received by the card reader, thus the data in the USB memory detected by the hardware in this Step is an USB configuration instruction;

In Step 104, in accordance with the received USB configuration instruction, configuration information of the USB interface is returned to the host;

In Embodiment 1, the configuration information of the USB interface includes number of card slots and end-point configuration of each card slot, in which the end-point configuration of each card slot includes output end-point and input end-point;

In Step 104 of Embodiment 1, the USB configuration instruction in the USB memory is read by the card reader, and then the corresponding configuration information of the USB interface is returned to the host by the card reader; the USB flat bit is reset when hardware detects that no data in the USB memory;

Between Step 103 and Step 104, the procedure further includes determining whether the USB configuration information is received, if the information is received, execute Step 104; if the information is not received, return to Step 103;

In Embodiment 1, the process that configuration information of the USB interface is returned to the host includes:

Step 104-1, detecting type of the received USB configuration instruction, execute Step 104-2 in the case that the USB configuration instruction is a device descriptor request; execute Step 104-3 in the case that the USB configuration instruction is a configuration descriptor request; execute Step 104-4 in the case that the USB configuration instruction is a card slot name request; execute Step 104-5 in the case that the USB configuration instruction is a card slot configuration request;

Step 104-2, send the device descriptor to the host, and execute Step 105;

In Embodiment 1, the device descriptor is obtained by the host via sending a Get_Device_Descriptor instruction, in which the device descriptor includes length of data package, type of descriptor, version number used for USB device, type of device, type of sub-device, protocol for device, length of the largest data package, VID, PID, device identification, version number of device, manufacturer, device information and number of device information and configuration of device of each number;

Before Step 105, Step 104-2 further includes that the value of enumeration flag is set as a first preset value;

Before Step 104-2, the procedure further includes determining whether the value of the enumeration flag is a preset initial value, if yes, execute Step 104-2; if no, return to Step 103;

Step 104-3, send header byte of device configuration and configuration data to the host, and execute Step 105;

In Embodiment 1, the header byte of device configuration is 09; configuration data includes type of card reader (CCID), number of card reader slots, flag number corresponding to each card slot, CCID class descriptor (protocol for CCID), address of the USB input/output end-point for each slot, etc; specifically, in the Embodiment 1, the card reader has three slots which maps device A, device B and device C respectively, and the corresponding flag numbers are a first numerical value, a second numerical value and a third numerical value respectively, preferably, the first numerical value is 4, the second numerical value is 5, and the third numerical value is 6;

Preferably, before Step 105, Step 104-3 further includes that the value of enumeration flag is set as a second preset value;

Before Step 104-3, the procedure further includes determining whether the value of enumeration is the first preset value, if it is the first preset value, execute Step 104-3; if it is not the first preset value, return to Step 103;

Step 104-4, in accordance with a flag number in the instruction, determine type of card slot name request, name of card slot A is returned to the host in the case that the flag number is the first numerical value, and execute Step 105; name of card slot B is returned to the host in the case that the flag number is the second numerical value, and execute Step 105; name of card slot C is returned to the host in the case that the flag number is the third numerical value, and execute Step 105;

Preferably, before Step 105, Step 104-4 further includes that the value of enumeration flag is set as a third preset value;

Before Step 104-4, the procedure further includes determining whether the value of enumeration flag is the second preset value, if it is the second preset value, execute Step 104-4, if it is not the second preset value, return to Step 103;

Preferably, in this Embodiment 1, the first numerical value is 4, the second numerical value is 5, and the third numerical value is 6;

Specifically, in Embodiment 1, the name of card slot A is configuring-non-contact-USB-communication card slot, the name of card slot B is configuring-large-card-USB-communication card slot, and the name of card slot C configuring-SIM1-card-USB-communication card slot;

Step 104-5, in accordance with flag number in the instruction, determine type of card slot configuration quest, configuration information of card slot A is returned to the host in the case that the flag number is the first numerical value, and execute Step 105; the configuration information of card slot B is returned to the host in the case that the flag number is the second numerical value, and execute Step 105; the configuration information of card slot C is returned to the host in the case that the flag number is the third numerical value, and then execute Step 105;

Preferably, before Step 105, Step 104-5 further includes that the value of enumeration flag is set as a fourth preset value;

Before Step 104-5, the procedure further includes determining whether the value of enumeration flag is the third preset value, if it is the third preset value, execute Step 105, if it is not the third preset value, return to Step 103;

Specifically, in Embodiment 1, configuration information of each card slot comprises card slot type descriptor, CCID class descriptor, output end-point configuration descriptor, input end-point configuration descriptor; preferably, output end-point configuration descriptor and input end-point configuration descriptor of card slot A in the Embodiment 1 is a first end-point and a second end-point respectively; output end-point configuration descriptor and input end-point configuration descriptor of card slot B is a fourth end-point and a fifth end-point respectively; output end-point configuration descriptor and input end-point configuration descriptor of card slot C is a seventh end-point and an eighth end-point respectively;

Preferably, configuration information of each card slot also includes interruption end-point descriptor, interruption end-point descriptor of card slot A is a third end-point, interruption end-point descriptor of card slot B is a sixth end-point, and interruption end-point descriptor of card slot C is a ninth end-point;

In Embodiment 1, a card slot represents a device, in which, output end-point is used for receiving data sent by the host, input end-point is used for returning processed result of instruction to the host, and interruption end-point is used for returning response of card slot status to the host;

Step 105, determine whether all of configuration information of the USB interface is returned to the host, if all of the information is returned to the host, execute Step 106, if not all of the information is returned to the host, return to Step 103;

Preferably, in Embodiment 1, the process of determining whether all of configuration information of the USB interface is return to the host is specifically determining whether the value of enumeration flag is the fourth preset value, if the value is the fourth preset value, execute Step 106, if the value is not the fourth preset value, return to Step 103;

Step 106, wait for an instruction sent by the host, and determine whether a set flag bit is detected, if a set flag bit is detected, execute Step 107, if a set flag bit is not detected, return to Step 106;

In this Embodiment 1, if a change of status of I/O card slot is detected by the card reader hardware, set the contact card flag bit; if time of timer reaches a preset time, the timing flag bit is set by the card reader hardware; if the card reader receives the instruction sent by the host, store the instruction into the USB memory; if data in the USB memory is detected by hardware, set the USB flag bit;

Step 107, determine type of the set flag bit, execute Step 108 in the case that the flag bit is a contact card flag bit; execute Step 109 in the case that the flag bit is a timing flag bit; execute Step 112 in the case that the flag bit is an USB flag bit;

In Embodiment 1, if there are multiple contact card slots and multiple non-contact card slots, each contact card slot set one contact card flag bit correspondingly; each non-contact card slot corresponds to one timing flag bit correspondingly;

Step 108, in accordance with the contact card flag bit, judging change type of a "a card is in the slot" pin electronic level of a current contact card slot which is corresponding to the contact card flag bit, if the electronic level changes from low level to high level, the contact card flag bit is reset, and the status of the current contact card slot is recorded as with-a-card but not powered on, and return to Step 106; if the electronic level changes from high level to low level, the contact card flag bit is reset, and the status of the current contact slot is recorded as without-a-card, and return to Step 106;

Preferably, if that configuration information of contact card includes interruption end-point is stated in process of enumeration, the result of changing from low level to high level in Step 108 further includes returning a with-a-card response to the host via the interruption end-point of the current contact card slot; the result of changing from high level to low level in Step 108 further includes returning a without-a-card response to the host via the interruption end-point of the current contact card slot;

Specifically, if the current contact card slot is card slot B, return a with/without-a-card response to the host via the sixth end-point; if the current contact card slot is card slot C, return a with/without-a-card response to the host via the ninth end-point;

Preferably, set contact card slot register, if value of register is 0, the status of contact card slot is with-a-card and powered on; if the value of register is 1, the status of contact card slot is with-a-card but not powered on; if the value of register is 2, the status of the contact card slot is without-a-card;

Step 109, in accordance with timing flag bit, send call-for-a-card instruction to the currently corresponding non-contact card slot regularly, and determine whether a response is received in a preset time, if the response is received, execute Step 110; if the response is not received in a preset time, execute Step 111;

Specifically, the ask-for-card instruction in Embodiment 1 is a wakeup instruction;

Step 110, determine whether the status of the current non-contact card slot is with-a-card, reset the timing flag bit and return to Step 106 if the status of the current non-contact card slot is with-a-card, reset the timing flag bit and record the status of the current non-contact card slot is with-a-card and return to Step 106 if the status of the current non-contact card slot is not with-a-card;

Preferably, if that the configuration information of the non-contact card slot includes interruption end-point, Step 110, in the case that the status of the current non-contact card slot is not with-a-card, further includes: return a with-a-card response to the host via the interruption end-point of the current non-contact card slot;

In Embodiment 1, in the case that the current non-contact card slot is inserted by a card for the first time, and the status of the current non-contact card slot is not recorded, return a with-a-card response to the host via the interruption end-point of the current non-contact card slot and record the status of the current non-contact card slot is with-a-card; specifically, in Embodiment 1, in the case that the non-contact card slot is card slot A, return a with-a-card response to the host via the third end-point;

After a card is inserted in the current non-contact card slot, anti-collision and activation of protocol layer are performed, the card reader sends a enter response instruction regularly to test the card so as to determine whether the card is in the non-contact field on an occasion that the status of the card is not affected, the card give the card reader a response if the card is not moved away; the card does not give the card reader a response and the card reader sends call-for-a-card instruction to call for a card if the card is moved away;

Step 111, determine whether the record status of the current non-contact card slot is without-a-card, reset the timing flag bit and return to Step 106 if the record status of the current non-contact card slot is without-a-card; reset the timing flag bit, record the status of the current non-contact card slot as without-a-card and return to Step 106 if the record status of the current non-contact card slot is not without-a-card;

Preferably, if that the configuration information of the non-contact card slot includes interruption end-point is stated in the process of enumeration, Step 111, in the case that the status of the current non-contact slot is not without-a-card, further includes: return a without-a-card response to the host via the interruption end-point of the current non-contact card slot;

Specifically, in Embodiment 1, if the current non-contact card slot is slot A, return a without-a-card response to the host via the third end-point;

Preferably, in Embodiment 1, set non-contact card slot register, the status of the non-contact card slot is with-a-card and the card is activated if the value of the register is 0; the status of the non-contact card slot is with-a-card but the card is not activated if the value of register is 1; the status of the non-contact card slot is without-a-card if the value of the register is 2;

Specifically, in this Embodiment, the with-a-card response is 0x50 0x03; the without-a-card response is 0x50 0x02;

Step 112, in accordance with the output end-point of the received instruction, test the type of the current card slot, the current card slot is card slot A and execute Step 113 in the case that the output end-point of the received instruction is the first end-point; the current card slot is card slot B and execute Step 113 in the case that the output end-point of the received instruction is the fourth end-point; the current card slot is card slot C and execute Step 113 in the case that the output end-point of the received instruction is the seventh end-point;

Step 113, store the instruction in the USB memory into the first buffer of the current card slot; parse the instruction in the first buffer, and process correspondingly according to the parsed result to obtain a result, and store the result into the second buffer of the current card slot;

Specifically, if store the data in the USB memory into the first buffer of the current card slot, no data in the USB memory, and in the case that the card reader tests no data in the USB memory, reset the USB flag bit;

In this Embodiment, the send flag of the current card slot is reset in the case that data in the second buffer is tested by hardware of the card reader;

Specifically, parse process in Step 113 meets CCID protocol, more details see Embodiment 3;

Specifically, Step 113 further includes: data identifier is set as 1 when the data sent by the host via the output end-point of the current card slot, 1 means data is being received currently; the data identification is set as 2 when all of the data is received, 2 means the received data is being parsed currently, and the card is being processed according to the parsed result; the data identification is set as 3 when the process is finished, 3 means the process is finished and the processed result is returned to the host; specifically, the data identification in Embodiment 1 is 3;

Step 114, the data in the second buffer is sent to the host via the input end-point of the current card slot, and return to Step 106;

In the Embodiment 1, Step 114 includes:

Step 114-1, send flag is tested and determine whether the send flag is set, execute Step 114-2 in the case that the send flag is set; execute Step 114-1 in the case that the send flag is not set;

Step 114-2, the data in the second buffer is sent to the host via the input end-point of the current card slot, and determine whether the send flag is set, return to Step 106 if the send flag is set; return to step 114-2 if the send flag is not set;

In Embodiment 1, the send flag of the current card slot is reset by the card reader in the case that the card reader tests that all of the data in the second buffer has been sent;

In this Embodiment 1, the data in the second buffer is sent to the host via the second end-point in the case that the current card slot is card slot A; the data in the second buffer is sent to the host via the fifth end-point in the case that the current card slot is card slot B; the data in the second buffer is sent to the host via the eighth end-point in the case that the current card slot is card slot C;

In the case that the send flag is reset, Step 114-2 further includes: the data identification is set as 0, that means data is sent successfully.

Embodiment 2

Figure 3:
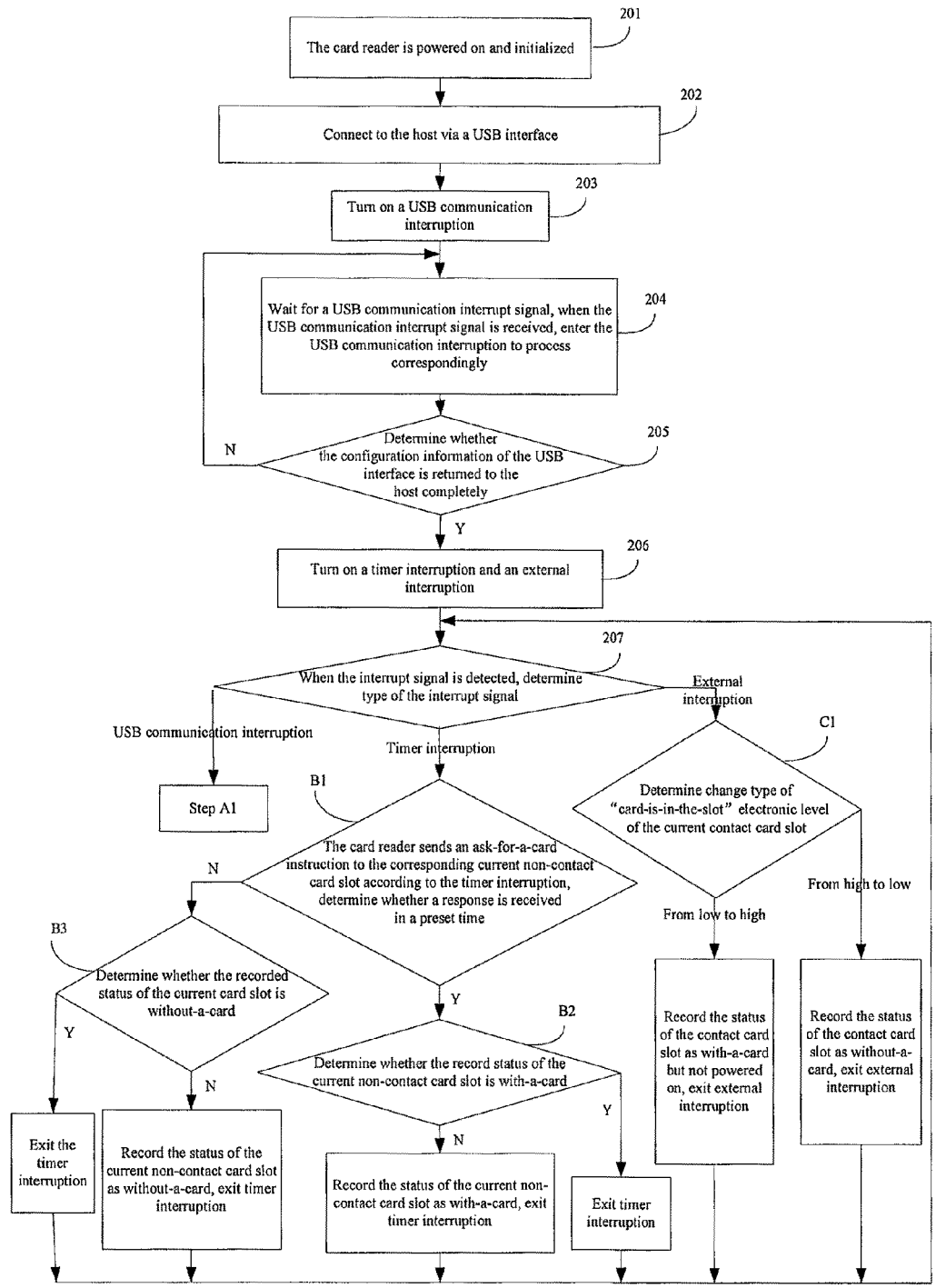
FIGS. 3-4 show a flowchart of a working method for a card reader with multiple card slots based on standard CCID protocol according to Embodiment 2 of the present invention.
Figure 4:
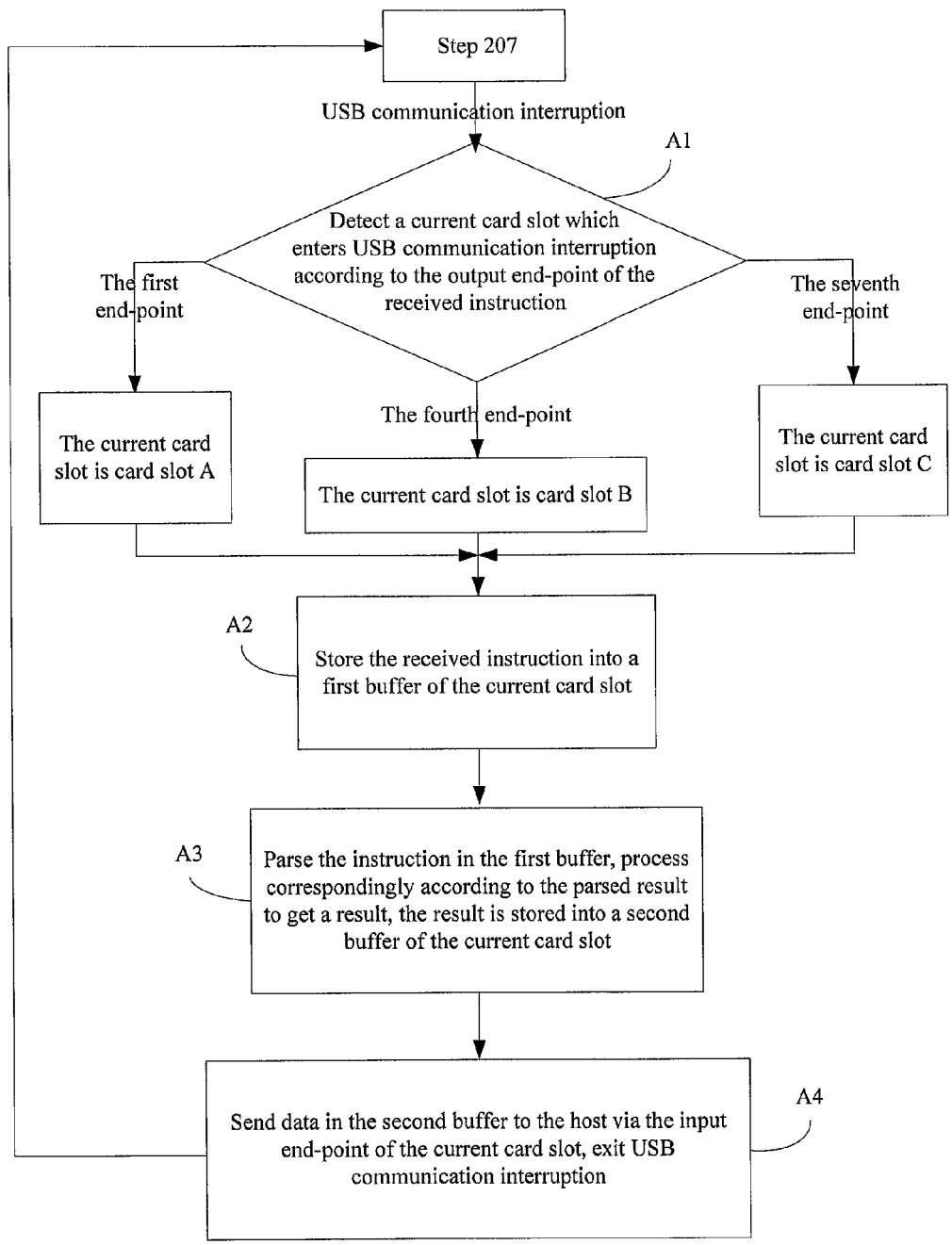
Figure 5:
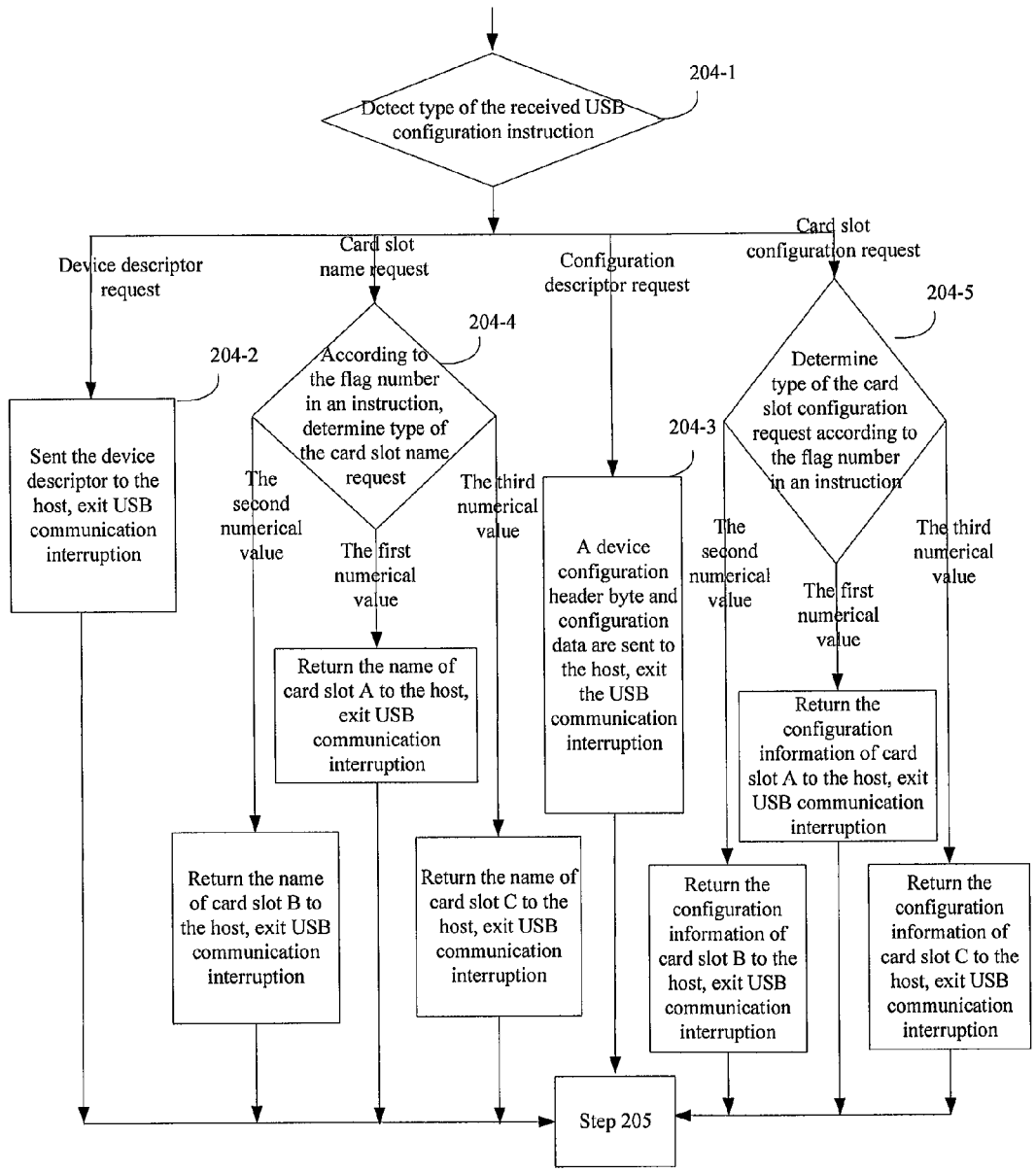
FIG. 5 shows a detailed drawing of Step 204 of Embodiment 2 of the present invention.

Embodiment 2 of the present invention provides a working method, based on standard CCID protocol, for a card reader with multiple slots, as shown in FIG. 3 and FIG. 4, the method includes:

Step 201, the card reader is powered on and initialized;

In Embodiment 2, RCC, IO card slot, a serial interface, an USB card slot, an external hardware, an USB clock, an USB communication interruption, and other configuration of an USB register are initialized by the card reader; and a value of an enumeration flag is set as a preset initial value;

Step 202, connect to a host via an USB interface;

Step 203, the USB communication interruption is turned on;

Step 204, wait for an USB communication interrupt signal, when the USB communication interrupt signal is received, enter the USB communication interruption to process correspondingly;

In Embodiment 2, entering the USB communication interruption to process correspondingly further includes: configuration information of the USB interface is returned to the host, exit the USB communication interruption and execute Step 205; in which the configuration information of the USB interface includes the amount of card slots and an end-point configuration of each card slot, in which the end-point configuration of each card slot includes: an output end-point and an input end-point; more details in Step 204, as shown is FIG. 5, include:

Step 204-1, a type of a received USB configuration instruction is detected, execute Step 204-2 in the case that the USB configuration instruction is a device descriptor request; execute Step 204-3 in the case that the USB configuration instruction is a configuration descriptor request; execute Step 204-4 in the case that the USB configuration instruction is a card slot name request; execute Step 204-5 in the case that the USB configuration instruction is a card slot configuration request;

Step 204-2, a device descriptor is sent to the host, exit the USB communication interruption, and execute Step 205;

In Embodiment 2, the host obtains the device descriptors by sending a Get_Device_Descriptor demand, in which the device descriptors include a length of a data package, a type of the descriptor, a version number for an USB device, a type of the device, a type of a sub-device, a protocol for the device, a maximum length of the data package, VID, PID, a device identification, a version number of the device, a manufacturer, device information and a serial number of the device, and configuration of the device of each serial number;

Preferably, before Step 205, Step 204-2 further includes: the value of the enumeration flag is set as a first preset value;

Before Step 204-2, the method further includes: determine whether the value of the enumeration flag is the preset initial value, if yes, execute Step 204-2; if no, exit the USB communication interruption and return to Step 203;

Step 204-3, a device configuration header byte and configuration data are sent to the host, exit the USB communication interruption, and execute Step 205;

The configuration header byte in Embodiment 2 is 09; the configuration data includes: a type of the card reader (CCID), the amount of card slots of card reader (bNum interrupt erfaces), a flag number corresponding to each card slot, descriptor of CCID class (protocol for CCID), an USB input/output end-point of each card slot, etc.; specifically, in this Embodiment 2, the card reader has three card slot, including card slot A, card slot B and card slot C, which maps device A, device B an device C respectively, the flag numbers corresponding to A, B and C are a first numerical value, a second numerical value and a third numerical value respectively, preferably, the first numerical value is 4, the second numerical value is 5, and the third numerical value is 6;

Preferably, before Step 205, Step 204-3 further includes: the value of the enumeration flag is set as a second preset value;

Before Step 204-3, the method may includes: determine whether the value of the enumeration flag is the first preset value, if yes, execute Step 204-3; if no, exit the USB communication interruption, and return to Step 203;

Step 204-4, in accordance with the flag number in an instruction, determine type of the card slot name request, the name of card slot A is returned to the host, exit the USB communication interruption, and Step 205 is executed in the case that the flag number is the first numerical value; the name of card slot B is returned to the host, exit the USB communication interruption, and execute Step 205 in the case that the flag number is the second numerical value; the name of card slot C is returned to the host, exit the USB communication interruption, and execute Step 205 in the case that the flag number is the third numerical value;

Preferably, before Step 205, Step 204-4 further includes: the value of the enumeration flag is set as a third preset value;

Before Step 204-4, the process further includes: determine whether the value of the enumeration flag is the second preset value, if yes, execute Step 204-4; if no, exit the USB communication interruption, return to Step 203;

Preferably, the first numerical value is 4, the second numerical value is 5, and the third numerical value is 6;

Specifically, in the Embodiment 2, the name of card slot A is configure-non-contact-USB-communication card slot, the name of card slot B is configure-normal-SIM-card-USB-communication card slot, the name of card slot C is configure-SIM1-card-USB-communication card slot;

Step 204-5, determine type of the card slot configuration request according to the flag number in an instruction, if the flag number is the first numerical number, the configuration information of card slot A is returned to the host, exit the USB communication interruption, and execute Step 205; if the flag number is the second numerical number, the configuration information of card slot B is returned to the host, exit the USB communication interruption, and execute Step 205; if the flag number is the third numerical value, the configuration information of card slot C is returned to the host, exit the USB communication interruption, and execute Step 205;

Preferably, before Step 205, Step 204-5 further includes: the value of the enumeration flag is set as a fourth preset value;

Before Step 204-5, the process may further includes: determine whether the value of the enumeration flag is the third preset value, if yes, execute Step 204-5; if no, exit the USB communication interruption, return to Step 203;

Specifically, in the Embodiment 2, the configuration information of each card slot include: a card slot type descriptor, a CCID class descriptor, an output end-point configuration descriptor, an input end-point configuration descriptor; preferably, in the Embodiment 2, the output end-point configuration descriptor of card slot A is a first end-point, and the input end-point configuration descriptor of card slot A is a second end-point; the output end-point configuration descriptor and the input end-point configuration descriptor of card slot B is a fourth end-point and a fifth end-point respectively; the output end-point configuration descriptor and the input end-point configuration descriptor of card slot C is a seventh end-point and a eighth end-point respectively;

Preferably, the configuration information of each card slot further include an interruption end-point descriptor, the interruption end-point descriptor of card slot A is a third end-point, the interruption end-point descriptor of card slot B is a sixth end-point, the interruption end-point descriptor of card slot C is a ninth end-point;

In Embodiment 2, a card slot maps a device, in which, the output end-point is configured to receive data sent by the host, the input end-point is configured to return a result of processing an instruction to the host, the interruption end-point is configured to input small data, and via the interruption endpoint the host is noticed by the card reader when a card is pulled in or pulled out;

Step 205, determine whether the configuration information of the USB interface is returned to the host completely, if yes, execute Step 206; if no, return to Step 204;

Preferably, in Embodiment 2, determining whether the configuration information of the USB interface is returned to the host completely specifically includes: determining whether the value of the enumeration flag is the fourth preset value, if yes, execute Step 206; if no, return to Step 204;

Step 206, a timer interruption and an external interruption are turned on;

Step 207, when an interrupt signal is detected, determine type of the interrupt signal, enter an USB communication interruption process which includes Step A1 to Step A4 in the case that the interruption is the USB communication interruption; enter a timer interruption process which includes Step B1 to Step B2 in the case that the interruption is a timer interruption; enter an external interruption process which includes Step C1 in the case that the interruption is the external interruption;

If there are multiple non-contact card slots, set a corresponding timer for each non-contact card slot;

Step A1, according to the output end-point of a received instruction, detect a current card slot for the USB communication interruption, the current card slot is card slot A and execute Step A2 in the case that the end-point is the first end-point; the current card slot is card slot B and execute Step A2 in the case that the end-point is the fourth end-point; the current card slot is card slot C and execute Step A2 in the case that the end-point is the seventh end-point;

Step A2, the received instruction is stored in a first buffer of the current card slot;

Step A3, the instruction in the first buffer is parsed, corresponding operation is performed according to a parsed result to get a result, and the result is stored in to a second buffer of the current card slot;

Specifically, more details about Step A3 in Embodiment 2 see Embodiment 3;

Preferably, in Embodiment 2, when hardware of the card reader detects that data is in the second buffer, a send flag of the current card slot is set;

Step A4, the data in the second buffer is sent to the host via the input end-point of the current card slot, exit the USB communication interruption, return to Step 207;

In Embodiment 2, Step A4 specifically includes:

Step A4-1, detect the send flag, determine whether the send flag is set, if yes, execute Step A4-2; if no, return to Step A4-1;

Step A4-2, the data in the second buffer is sent to the host via the input end-point of the current card slot; determine whether the send flag is reset, if yes, exit the USB communication interruption, return to Step 207; if no, return to Step A4-2;

Specifically, in this Embodiment 2, when the hardware of the card reader detects that the data in the second buffer is sent completely, the send flag is reset;

In Embodiment 2, the data in the second buffer is sent to the host via the second end-point if the current card slot is card slot A; the data in the second buffer is sent to the host via the fifth end-point if the current card slot is card slot B; the data in the second buffer is sent to the host via the eighth end-point if the current card slot is card slot C;

Step B1, the card reader sends a ask-for-card instruction to the corresponding current non-contact card slot according to the timer interruption, determine whether a response is received in a preset time, if yes, execute Step B2; if no, execute Step B3;

Specifically, the ask-for-card instruction in this Embodiment 2 is a wakeup instruction;

If there are two non-contact card slots in the card reader, set two timers correspondingly; when time of the first timer reaches the preset time, the first non-contact card slot in the card reader is triggered; when time of the second timer reaches the preset time, the second non-contact card slot in the card reader is triggered;

Step B2, determine whether the recorded status of the current non-contact card slot is with-a-card, if yes, exit the timer interruption, return to Step 207; if no, record the status of the current non-contact card slot as with-a-card, exit the timer interruption, return to Step 207;

Preferably, in Embodiment 2, if the configuration information of the non-contact card slot including an interruption end-point is stated during the enumeration process, when the recorded status of the current non-contact card slot is not with-a-card, Step B2 further includes: a with-a-card response is returned to the host via the interruption end-point of the current non-contact card slot;

In Embodiment 2, if the current non-contact card slot is inserted by a card for a first time and the status of the current non-contact card slot is not recorded, a with-a-card response is returned to the host directly and the status of the current non-contact card slot is recorded as with-a-card in Step B2; specifically, the current non-contact card slot is card slot A, and the with-a-card response is returned to the host via the third end-point;

Step B3, determine whether the recorded status of the current non-contact card slot is without-a-card, if yes, exit the timer interruption, return to Step 207; if no, record the status of the current non-contact card slot as without-a-card, exit the timer interruption, return to Step 207;

Preferably, in Embodiment 2, if the configuration information of the non-contact card slot including the interruption end-point is stated in the enumeration process, when the recorded status of the current non-contact card slot is not without-a-card, Step B3 further includes: a without-a-card response is returned to the host via the interruption end-point of the current non-contact card slot;

Specifically, in this Embodiment 2, if the current non-contact card slot is card slot A, the without-a-card response is returned to the host via the third end-point;

Preferably, in Embodiment 2, a non-contact card slot register is set, if a value of the register is 0, the status of the non-contact card slot is with-a-card and the card is activated; if the value is 1, the status of the non-contacted card slot is with-a-card and the card is not activated; if the value is 2, the status of the non-contacted card slot is without-a-card;

Step C1, determine a change type of a "card-is-in-the-slot" pin electrical level of the current contact card slot, if it changes from low level to high level, a status of a contact card slot is recorded as with-a-card but not powered on, exit the external interruption, return to Step 207; if it changes from high level to low level, the status of the contact card slot is recorded as without-a-card, exit the external interruption, return to Step 207;

Preferably, in this Embodiment 2, if the configuration information of the contact card slot including the interruption end-point is stated in the enumeration process, changing from low level to high level in Step C1 further includes: a with-a-card response is returned to the host via the interruption end-point of the current contact card slot; changing from high level to low level in Step C1 includes: a without-a-card response is returned to the host via the interruption end-point of the current contact card slot; specifically, in Embodiment 2, if the current contact card slot is card slot B, the with/without-a-card response is returned to the host via the sixth end-point; if the current contact card slot is card slot C, the with/without-a-card response is returned to the host via the ninth end-point;

Preferably, in this Embodiment 2, set a contact card slot register, if a value of the register is 0, the status of the contact card slot is with-a-card and the card is powered on; if the value is 1, the status of the contact card slot is with-a-card and the card is not powered on; if the value is 2, the status of the contact card slot is without-a-card;

Specifically, in this Embodiment 2, the with-a-card response is 0x50 0x03; the without-a-card response is 0x50 0x02.

Embodiment 3

Figure 6:
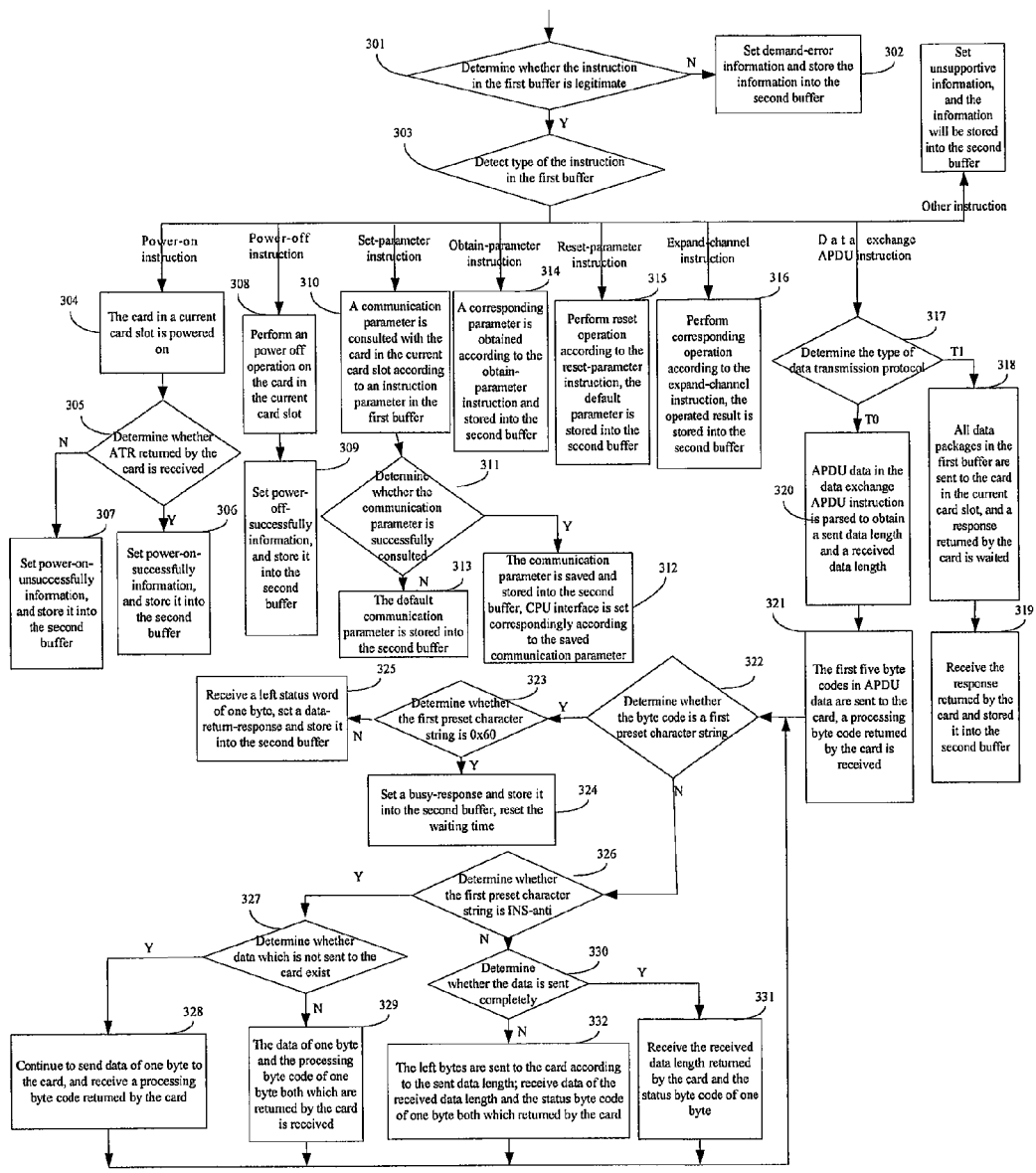
FIG. 6 shows a detailed flowchart of parsing the data in the first buffer of the current card slot according to the CCID protocol, processing correspondingly according to the parsed result, and storing the processed result in the second buffer of the current card slot according to Embodiment 3.

Embodiment 3 of the present invention provides details of the implementation procedure that data in the first buffer of a current card slot is parsed by the card reader, corresponding process is performed according to the parsed result to get a processed result, and the result is stored into the second buffer of the current card slot; as shown in FIG. 6, the process includes:

Step 301, determine whether the instruction in the first buffer is legitimate, if yes, execute Step 303; if no, execute Step 302;

In Embodiment 3, the specific implementation procedure of Step 301 is: the data in the first buffer is parsed to obtain type of the instruction and a length value of data, determine whether the obtained length value of data is identical to a length of all data in the first buffer, if yes, the instruction in the first buffer is legitimate; if no, the instruction in the first buffer is not legitimate; if the type of the instruction is a data exchange APDU instruction, the parsed result further includes APDU data;

Specifically, in Embodiment 3, the parsed result includes data of the type of data instruction, a length value of data and a card slot identification, etc.;

Step 302, set demand-error information and store the information into the second buffer, the procedure continue:

Step 303, detect the type of the instruction in the first buffer, execute Step 304 if the instruction is a power on instruction; execute Step 308 if the instruction is a power off instruction; execute Step 310 if the instruction is a set-parameter instruction; execute Step 314 if the instruction is an obtain-parameter instruction; execute Step 315 if the instruction is a reset-parameter instruction; execute Step 316 if the instruction is an expand-channel instruction; execute Step 317 if the instruction is a data exchange APDU instruction; and if the instruction is another instruction, settings do not support the information, and the information will be stored into the second buffer;

Step 304, a card in a current card slot is powered on;

In Embodiment 3, the card reader makes a card slot corresponding to the card slot identification in the parsed result as the current card slot;

Step 305, determine whether ATR (answer-to-reset file) returned by the card is received, if yes, execute Step 306; if no, execute Step 307;

In this Embodiment 3, the ATR includes reset parameters of the card, such as waiting time, communication rate and T0/T1 protocol;

Step 306, set power-on-successfully information, and store it into the second buffer, continue;

Step 307, set power-on-unsuccessfully information, and store it into the second buffer, continue;

Step 308, perform an power off operation on the card in the current card slot;

Step 309, set power-off-successfully information, and store it into the second buffer, continue;

Step 310, a communication parameter is consulted with the card in the current card slot according to an instruction parameter in the first buffer;

In Embodiment 3, the communication parameter includes Baud rate, T0/T1 transmission mode, etc.;

Step 311, determine whether the communication parameter is successfully consulted, if yes, execute Step 312; if no, execute Step 313;

In Embodiment 3, Step 311 specifically includes: determining whether data returned by the card is identical to data sent to the card, if yes, the communication parameter is successfully consulted; if no, the communication parameter is not successfully consulted;

Step 312, the communication parameter is saved and stored into the second buffer, CPU interface is set correspondingly according to the saved communication parameter, continue;

Step 313, a default communication parameter is stored into the second buffer, continue:

Step 314, a corresponding parameter is obtained according to the obtain-parameter instruction and stored into the second buffer, continue;

Step 315, perform reset operation according to the reset-parameter instruction, the default parameter is stored into the second buffer, continue;

Step 316, perform corresponding operation according to the expand-channel instruction, the operated result is stored into the second buffer, continue;

In this Embodiment 3, the corresponding operation includes: update firmware;

Step 317, determine the type of data transmission protocol, if it is T1, execute Step 318; if it is T0, execute Step 320;

Specifically, in this Embodiment 3, determine the type of protocol of data transmission according to the set-parameter instruction;

Step 318, all data packages in the first buffer are sent to the card in the current card slot, and a response returned by the card is waited;

Step 319, receive the response returned by the card and store it into the second buffer, continue;

Step 320, APDU data in the data exchange APDU instruction is parsed to obtain a sent data length and a received data length;

Step 321, the first five byte codes in APDU data are sent to the card, a processing byte code returned by the card is received;

In this Embodiment 3, CLA, INS, P1, P2 and Lc/Le in the instruction are sent to the card;

In this Embodiment 3, types of the byte code (SW1 or SW2) returned by the card include: 6X or 9X, $\overline{INS}$ and INS;

Step 322, determine whether the byte code is a first preset character string, if yes, execute Step 323; if no, execute Step 326;

Specifically, the first preset character string in this Embodiment 3 is any one between 0x60 and 0x6F or any one between 0x90 and 0x9F;

Step 323, determine whether the first preset character string is 0x60, if yes, execute Step 324; if no, execute Step 325;

Step 324, set a busy-response and store it into the second buffer, reset the waiting time, continue;

Step 325, receive a left status word of one byte, set a data-return-response and store it into the second buffer, continue;

Step 326, determine whether the first preset character string is INS, if yes, execute Step 327; if no, execute Step 330;

Step 327, determine whether data which is not sent to the card exist, if yes, execute Step 328; if no, execute Step 329;

Step 328, continue to send data of one byte to the card, and receive a processing byte code returned by the card, return to Step 322;

In this Embodiment 3, when data which is not sent is in the card reader, the card reader continues to send data of one byte to the card and receives the processing byte code returned by the card; determine type of the byte code;

Step 329, the data of one byte and the processing byte code of one byte both of which are returned by the card is received, Step 322 is returned;

In Embodiment 3, when all of the data is sent to the card by the card reader, the processing byte code returned by the card is received and type of the byte code is determined;

Step 330, determine whether the data is sent completely, if yes, execute Step 331; if no, execute Step 332;

Step 331, receive the received data length returned by the card and the status byte code of one byte, return to Step 322;

Step 332, the left bytes are sent to the card according to the sent data length; receive data of the received data length and the status byte code of one byte both of which returned by the card, return to Step 322;

In Embodiment 3, if the returned configuration information of each card slot includes an interruption end-point when the USB configuration instruction is received and the type of the instruction in the first buffer in Step 303 is a query instruction, execute Step 333;

Step 333, the recorded status of the card slot is stored into the second buffer;

Specifically, the status of the card slot includes without-a-card, with-a-card with power off, and with-a-card and powered on;

In Embodiment 3, set a contact card slot register, if a value of the register is 0, the status of the contact card slot is with-a-card and powered on; if the value of the register is 1, the status of the contact card slot is with-a-card but not powered on; if the value of the register is 2, the status of the contact card slot is without-a-card; set a non-contact card slot register, if a value of the register is 0, the status of the non-contact card slot is with-a-card and the card is activated; if the value of the register is 1, the status of the non-contact card slot is with-a-card and the card is not activated; if the value of the register is 2, the status of the non-contact card slot is without-a-card.

Specifically, in Embodiment 3, continue means execute Step 114 or Step A4.

While all above are preferred embodiments of the present invention, the scope of the protection is not limited to hereof, variations and changes which can be made by those skilled in the art easily fall in scope of the protection. It is intended that the following claims define the scope of the protection and that method and structures within the scope of these claims and their equivalents be covered thereby.

The invention claimed is:

1. A working method for a card reader with multiple card slots based on standard CCID protocol, wherein said method comprises:

Step S1, powering on the card reader and initializing the card reader, and connecting, by the card reader, to a host via an USB interface;

Step S2, waiting for receiving an instruction sent by the host, and detecting an USB flag bit, determining whether the USB flag bit is set, if yes, executing Step S3; if no, returning to Step S2;

Step S3, returning an configuration information of the USB interface to the host according to a received USB configuration instruction, in which the configuration information of the USB interface includes the amount of card slots and an end-point configuration of each card slot, and in which the end-point configuration of every slot includes an output end-point and an input end-point;

Step S4, determining whether the configuration information of the USB interface is returned to the host completely, if yes, executing Step S5; if no, returning to Step S2;

Step S5, waiting for receiving an instruction sent by the host, and when a set flag bit is detected, determining type of the set flag bit, executing Step S6 in the case that the flag bit is a contact card flag bit; executing Step S7 in the case that the flag bit is a timing flag bit; and executing Step S10 in the case that the flag bit is an USB flag bit;

Step S6, determining change type of a "card-is-in-the-slot" pin electronic level of a corresponding current contact card slot in accordance with the contact card flag bit, if the electronic level changes from low level to high level, the contact card flag bit is reset, and the status of the current contact card slot is recorded as with-a-card but not powered on, returning to Step S5; if the electronic level changes from high level to low level, the contact card flag bit is reset, and the status of the current contact slot is recorded as without-a-card, returning to Step S5;

Step S7, sending a call-for-a-card instruction to a corresponding current non-contact card slot regularly in accordance with the timing flag bit, and determining whether a response is received in a preset time, if yes, executing Step S8; if no, executing Step S9;

Step S8, determining whether the recorded status of the current non-contact card slot is with-a-card, if yes, resetting the timing flag bit and returning to Step S5; if no, resetting the timing flag bit and recording the status of the current non-contact card as with-a-card, and returning to Step S5;

Step S9, determining whether the recorded status of the current non-contact card slot is without-a-card, if yes, resetting the timing flag bit and returning to Step S5; if no, resetting the timing flag bit and recording the status of the current non-contact card slot as without-a-card, and returning to Step S5;

Step S10, detecting a corresponding current card slot according to an output end-point of a received instruction;

Step S11, storing an instruction in a USB memory into a first buffer of the current card slot; parsing the instruction in the first buffer, performing a corresponding operation according to the parsed result to get a result, and storing the result into a second buffer of the current card slot; and Step S12, sending data in the second buffer to the host via an input end-point of the current card slot, returning to Step S5.

2. The method of claim 1, wherein, between Step S2 and Step S3, the method further comprises:

determining whether the USB configuration instruction is received, if yes, executing Step S3; if no, returning to Step S2.

3. The method of claim 1, wherein, Step S3 further comprising:

Step S3-1, detecting type of the received USB configuration instruction, executing Step S3-2 in the case that the USB configuration instruction is a device descriptor request; executing Step S3-3 in the case that the USB configuration instruction is a configuration descriptor request; executing Step S3-4 in the case that the USB configuration instruction is a card slot name request; executing Step S3-5 in the case that the USB configuration instruction is a card slot configuration request;

Step S3-2, sending the device descriptor to the host, and executing Step S4;

Step S3-3, sending a device configuration header byte and configuration data to the host, and executing Step S4; in which the configuration data includes the amount of card slots and a flag number of each card slot;

Step S3-4, returning name of a corresponding card slot to the host according to the flag number in the instruction, and executing Step S4; and Step S3-5, returning configuration information of the corresponding card slot to the host according to the flag number in the instruction, and executing Step S4; in which the configuration information of the card slot includes the output end-point and the input end-point.

4. The method of claim 3, wherein, the initialization in Step S1 further comprises that a value of an enumeration flag is set as a preset initial value;

before Step S4, Step S3-2 further comprises that the value of the enumeration flag is set as a first preset value;

before Step S4, Step S3-3 further comprises that the value of the enumeration flag is set as a second preset value;

before Step S4, Step S3-4 further comprises that the value of the enumeration flag is set as a third preset value;

before Step S4, Step S3-5 further comprises that the value of the enumeration flag is set as a fourth preset value; and Step S4 specifically comprises: determining whether the value of the enumeration flag is the fourth preset value, if yes, all of the configuration information of the USB interface is returned to the host, executing Step S5; if no, the configuration information of the USB interface is not completely returned to the host, returning to Step S2.

5. The method of claim 1, wherein, the end-point configuration of each card slot further comprises an interruption end-point;

in Step S6, determining the "card-is-in-the-slot" pin electronic level of the current contact card slot changes from low level to high level further comprises: returning a with-a-card response to the host via the interruption end-point of the current contact card slot; in Step S6, determining that the "card-is-in-the-slot" pin electronic level of the current contact card slot changes from high level to low level further comprises: returning a without-a-card response to the host via the interruption end-point of the current contact card slot;

when the status of the current non-contact card slot is not with-a-card in Step S8, Step S8 further comprises: returning a with-a-card response to the host via the interruption end-point of the current non-contact card slot; and when the status of the current non-contact card slot is not without-a-card in Step S9, the Step further comprises: returning a without-a-card response to the host via the interruption end-point of the current non-contact card slot.

6. The method of claim 1, wherein, parsing data in the first buffer, and performing corresponding operation according to the parsed result to get a result, and storing the result into the second buffer in Step S11, further comprises:

Step S11-1, determining whether the instruction in the first buffer is legitimate, if yes, executing Step S11-3; if no, executing Step S11-2;

Step S11-2, setting demand-error information and storing the demand-error information into the second buffer, and executing Step S12; and Step S11-3, detecting type of the instruction in the first buffer, and performing corresponding operation.

7. The method of claim 6, wherein, Step S11-3 comprises:

if the type of the instruction in the first buffer is a power-on instruction, powering on the card in the current card slot, determining whether an answer-to-reset file sent by the card is received, if yes, setting information of successfully powering on, and storing the information into the second buffer, and executing Step S12; if no, setting information of unsuccessfully powering on, and storing the information into the second buffer, and executing Step S12.

8. The method of claim 6, wherein, Step S11-3 comprises:

if the type of the instruction in the first buffer is a power-off instruction, powering off the card in the current card slot; setting information of successfully powering off, and storing the information into the second buffer, and executing Step S12.

9. The method of claim 6, wherein, Step S11-3 comprises:

if the type of the instruction in the first buffer is a set-parameter instruction, consulting communication parameter according to an instruction parameter in the first buffer and the card in the current card slot; and determining whether the communication parameter is successfully consulted, if yes, saving the communication parameter and storing the parameter into the second buffer, and setting the CPU interface correspondingly according to the saved communication parameter, and executing Step S12; if no, storing a defaulted communication parameter into the second buffer, and executing Step S12.

10. The method of claim 6, wherein, Step S11-3 comprises:

if the type of the instruction in the first buffer is a reset-parameter instruction, performing resetting operation according to the reset-parameter instruction, and storing a defaulted parameter into the second buffer, and executing Step S12.

11. The method of claim 7, wherein, Step S11-3 comprises:

if the type of the instruction in the first buffer is a data-exchange APDU instruction, in accordance with the answer-to-reset file, determining type of a protocol on data transfer, if the type is T1, executing Step C1; if the type is T0, executing Step C3;

Step C1, sending all data packages in the first buffer to a card in the current card slot, and waiting for a response returned by the card;

Step C2, receiving the response returned by the card, and storing the response into the second buffer, and executing Step S12;

Step C3, parsing APDU data in the data-exchange APDU instruction to obtain a length of the sent data and a length of the received data;

Step C4, sending the first five byte-codes in the APDU data to the card, and receiving a processing byte-code returned by the card;

Step C5, determining whether the byte-code is a first preset character string, if yes, executing Step C6, if no, executing Step C9;

Step C6, determining whether the first preset character string is 0x60, if yes, executing Step C7, if no, executing Step C8;

Step C7, setting a busy-response, and storing the busy-response into the second buffer, resetting a waiting time, and executing Step S12;

Step C8, receiving a status word of the left one byte, setting a return-data response and storing it into the second buffer, and executing Step S12;

Step C9, determining whether the first preset character string is $\overline{INS}$, if yes, executing Step C10, if no, executing Step C13;

Step C10, determining whether data which is not sent to the card exists, if yes, executing Step C11; if no, executing Step C12;

Step C11, continuing to send data of one byte to the card, and receiving a processing byte-code of one byte returned by the card, and returning to Step C5;

Step C12, receiving the data of one byte and the processing byte code of one byte, both of which are received by the card, and returning to Step C5;

Step C13, determining whether the data is sent completely, if yes, executing Step C14, if no, executing Step C15;

Step C14, receiving data for receiving the length of data and status-byte-code of one byte, both of which are returned by the card, returning to Step C5; and Step C15, sending a left byte to the card in accordance with the length of sent data, and receiving data for receiving the length of data and status-byte-code of one byte, both of which are returned by the card, returning to Step C5.

12. A working method for a card reader with multiple card slots based on standard CCID protocol, wherein said method comprises:

Step P1, powering on the card reader and starting initialization, and connecting, by the card reader, to a host via an USB interface;

Step P2, turning on an USB communication interruption;

Step P3, waiting for a USB communication interrupt signal, when receiving the USB communication interrupt signal, entering USB interruption to perform corresponding operation which includes sending configuration information of an USB interface back to the host, then exit the USB communication interrupt, and executing Step P4; in which the configuration information of an USB interface includes the amount of card slots and an end-point configuration of each card slot, in which the end-point configuration of each card slot includes an output end-point and an input end-point;

Step P4, determining whether all of the configuration information of the USB interface is returned to the host, if yes, executing Step P5; if no, returning to Step P3;

Step P5, turning on a timer interruption and an external interruption; and

Step P6, when an interruption signal is detected, determining type of the interruption signal, if the signal is an USB communication interrupt signal, entering USB communication interruption including Step A1 to Step A4; if the signal is a timer interruption signal, entering timer interruption including Step B1 to Step B3; if the signal is an external interruption signal, entering external interruption including Step C1;

Step A1, detecting a corresponding current card slot of the USB communication interruption in accordance with the output end-point of the received instruction;

Step A2, storing the received instruction into a first buffer of the current card slot;

Step A3, parsing the instruction in the first buffer, performing corresponding operation to get a result according to the parsed result, and storing the result into a second buffer of the current card slot;

Step A4, sending data in the second buffer to the host via an input end-point of the current card slot, exiting USB communication interruption, and returning to Step P6;

Step B1, sending a call-for-a-card instruction to currently corresponding non-contact card slot in accordance with a timer interruption, and then determining whether a response is received in a preset time, if yes, executing Step B2; if no, executing Step B3;

Step B2, determining whether the recorded status of the current non-contact card slot is a with-a-card status, if yes, exiting the timer interruption, and returning to Step P6; if no, recording the status of the current non-contact card slot as with-a-card, exiting the timer interruption, and returning to Step P6;

Step B3, determining whether the recorded status of the current non-contact card slot is a without-a-card status, if yes, exiting the timer interruption, and returning to Step P6; if no, recording the status of the current non-contact card slot as without-a-card, exiting the timer interruption, and returning to Step P6;

Step C1, determining change type of a "card-is-in-the-slot" pin electronic level of a currently corresponding contact card slot in accordance with the external interruption, recording the status of the contact card slot as with-a-card but not powered on if the electronic level changes from low level to high level, exiting the external interruption, and returning to Step P6; recording the status of the contact card slot as without-a-card if the electronic level changes from high level to low level, exiting the external interruption, and returning to Step P6.

13. The method of claim 12, wherein, entering an USB communication interruption to perform corresponding operation in Step P3 comprises:

Step D1, detecting type of the received USB configuration instruction, executing Step D2 in the case that the USB configuration instruction is a device descriptor request; executing Step D3 in the case that the USB configuration instruction is a configuration descriptor request; executing Step D4 in the case that the USB configuration instruction is a card slot name request; and executing Step D5 in the case that the USB configuration instruction is a card slot configuration request;

Step D2, sending the device descriptor to the host, exiting USB communication interruption, and executing Step P4;

Step D3, sending a header byte of device configuration and configuration data to the host, exiting the USB communication interruption, and executing Step P4; in which the configuration data includes the amount of card slots and a flag number corresponding to each card slot;

Step D4, returning a name of a corresponding card slot to the host according to the flag number in the instruction, exiting the USB communication interruption, and executing Step P4; and Step D5, returning the configuration information corresponding to the card slot to the host according to the flag number in the instruction, exiting USB communication interruption, and executing Step P4; in which the configuration information of the card slot includes an output end-point and an input end-point.

14. The method of claim 13, wherein, before Step P4, Step D2 further comprises that a value of an enumeration flag is set as a first preset value;

before Step P4, Step D3 further comprises that the value of the enumeration flag is set as a second preset value;

before Step P4, Step D4 further comprises that the value of the enumeration flag is set as a third preset value;

before Step P4, Step D5 further comprises that the value of the enumeration flag is set as a fourth preset value;

specifically, Step P4 comprises that determine whether the value of the enumeration flag is the fourth preset value, if yes, all of the configuration information of the USB interface is returned to the host, and executing Step P5; if no, not all of the configuration information of the USB interface is returned to the host, and returning to Step P3.

15. The method of claim 12, wherein, the end-point configuration of each card slot further comprises an interruption end-point;

when the recorded status of the non-contact card slot is not the status of with-a-card, Step B2 further comprises that a with-a-card response is returned to the host via the interruption end-point of the current non-contact card slot;

when the recorded status of the non-contact card slot is not the status of without-a-card, Step B3 further comprises that a without-a-card response is returned to the host via the interruption end-point of the current non-contact card slot;

in Step C1, determining that the "card-is-in-the-slot" pin electronic level of the current contact card slot changes from low level to high level further comprises: returning a with-a-card response to the host via the interruption end-point of the current contact card slot; and in Step C1, determining that the "card-is-in-the-slot" pin electronic level of the current contact card slot changes from high level to low level further comprises: returning a without-a-card response to the host via the interruption end-point of the current contact card slot.

16. The method of claim 12, wherein, parsing data in the first buffer, and performing corresponding operation according to the parsed result to get a result, and storing the result into the second buffer in Step A3 comprises:

Step A3-1, determining whether data in the first buffer is legitimate, if yes, executing Step A3-3; if no, executing Step A3-2;

Step A3-2, setting demand-error information and storing the demand-error information into the second buffer, and executing Step A4; and Step A3-3, detecting type of the instruction in the first buffer, and performing corresponding operation.

17. The method of claim 16, wherein, Step A3-3 comprises:

if the type of the instruction in the first buffer is a power-on instruction, powering on the card in the current card slot, and determining whether an answer-to-reset file returned by the card is received, if yes, setting information of successfully powering on, and storing the information into the second buffer, and executing Step A4; if no, setting information of unsuccessfully powering on, and storing the information into the second buffer, and executing Step A4.

18. The method of claim 16, wherein, Step A3-3 comprises:

if the type of the instruction in the first buffer is a power-off instruction, powering off the card in the current card slot; setting information of successfully powering off, storing the information into the second buffer, and executing Step A4.

19. The method of claim 16, wherein, Step A3-3 comprises:

if the type of the instruction in the first buffer is a set-parameter instruction, consulting communication parameter according to an instruction parameter in the first buffer and the card in the current card slot; and determining whether the communication parameter is successfully consulted, if yes, saving the communication parameter and storing the parameter into the second buffer, setting the CPU interface correspondingly according to the saved communication parameter, and executing Step A4; if no, storing a defaulted communication parameter into the second buffer, and executing Step A4.

20. The method of claim 16, wherein, Step A3-3 further comprises:

if the type of the instruction in the first buffer is a reset-parameter instruction, performing resetting operation according to the reset-parameter instruction, and storing a defaulted parameter into the second buffer, and executing Step A4.

21. The method of claim 17, wherein, Step A3-3 comprise:

if the type of the instruction in the first buffer is a data-exchange APDU instruction, determining type of protocol on data transfer in accordance with the answer-to-reset file, if the type is T1, executing Step C1; if the type is T0, executing Step C3;

Step C1, sending all data packages in the first buffer to a card in the current card slot, and waiting for a response returned by the card;

Step C2, receiving the response returned by the card, storing the response into the second buffer, and executing Step A4;

Step C3, parsing APDU data in the data-exchange APDU instruction to obtain length of the sent data and length of the received data;

Step C4, sending the first five byte-codes in the APDU data to the card, and receiving the processing byte-code returned by the card;

Step C5, determining whether the byte-code is a first preset character string, if yes, executing Step C6, if no, executing Step C9;

Step C6, determining whether the first preset character string is 0x60, if yes, executing Step C7, if no, executing Step C8;

Step C7, setting a busy-response, and storing the busy-response into the second buffer, resetting a waiting time, and executing Step A4;

Step C8, receiving a status word of the left one byte, setting a return-data response and storing the return-data response into the second buffer, and executing Step A4;

Step C9, determining whether the first preset character string is $\overline{INS}$, if yes, executing Step C10, if no, executing Step C13;

Step C10, determining whether data which is not sent to the card exists, if yes, executing Step C11; if no, executing Step C12;

Step C11, continuing to send data of one byte to the card, and receiving a processing byte-code of one byte returned by the card, and returning to Step C5;

Step C12, receiving the data of one byte and the processing byte code of one byte, both of which are received by the card, and returning to Step C5;

Step C13, determining whether all data is sent, if yes, executing Step C14, if no, executing Step C15;

Step C14, receiving data for receiving length of data and status-byte-code of one byte, both of which are returned by the card, and returning to Step C5; and Step C15, sending left bytes to the card in accordance with length of sent data, and receiving data for receiving length of data and status-byte-code of one byte, both of which are returned by the card, and returning to Step C5.

* * * * *